No. 777,088. PATENTED DEC. 13, 1904.
J. C. FRANKLIN & C. M. BUCE.
INSECT EXTERMINATOR.
APPLICATION FILED MAR. 22, 1904.

NO MODEL.

Witnesses
Inventors
J. C. Franklin
C. M. Buce
By
Attorneys

No. 777,088. Patented December 13, 1904.

UNITED STATES PATENT OFFICE.

JAMES C. FRANKLIN AND CHARLES M. BUCE, OF BRAGGS, INDIAN TERRITORY.

INSECT-EXTERMINATOR.

SPECIFICATION forming part of Letters Patent No. 777,088, dated December 13, 1904.

Application filed March 22, 1904. Serial No. 199,407. (No model.)

*To all whom it may concern:*

Be it known that we, JAMES C. FRANKLIN and CHARLES M. BUCE, citizens of the United States, residing at Braggs, Cherokee Nation, Indian Territory, have invented certain new and useful Improvements in Insect-Exterminators, of which the following is a specification.

The object of this invention is to rid cotton-plants of the boll-weevil, as well as to protect plants generally from the ravages of insects.

In accordance with this invention the insects are attracted to a determinate point, a draft is maintained within a given radius of the center of attraction for collection of the insects, and as a final step the insects are crushed.

The instrumentalities for attaining the purpose of the invention comprise an attracter which is a suitable illuminator, a collector covering a determinate radius within the nucleus of the attracter, means for creating a draft within the collector for positively gathering the insects within the attractive force of said draft, a conveyer, and a crusher for extinguishing the life of the insects in one continuous operation.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
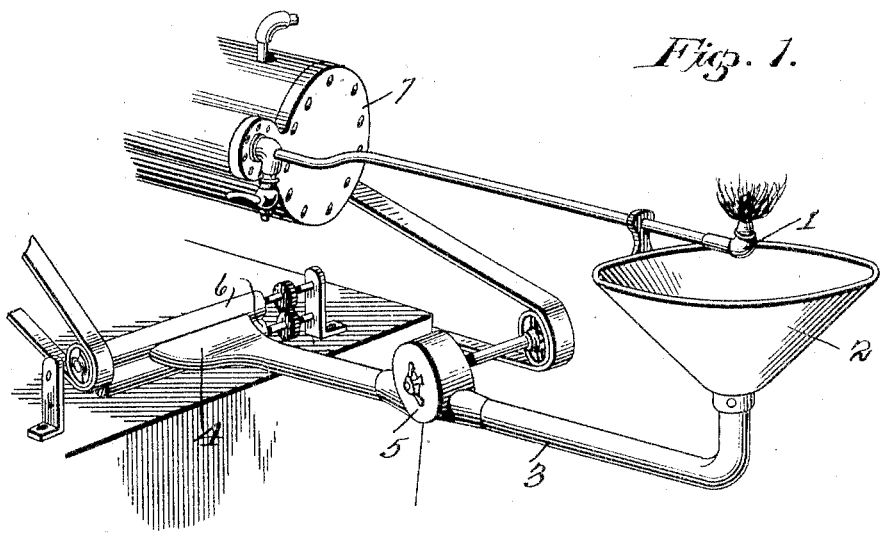
Figure 2:
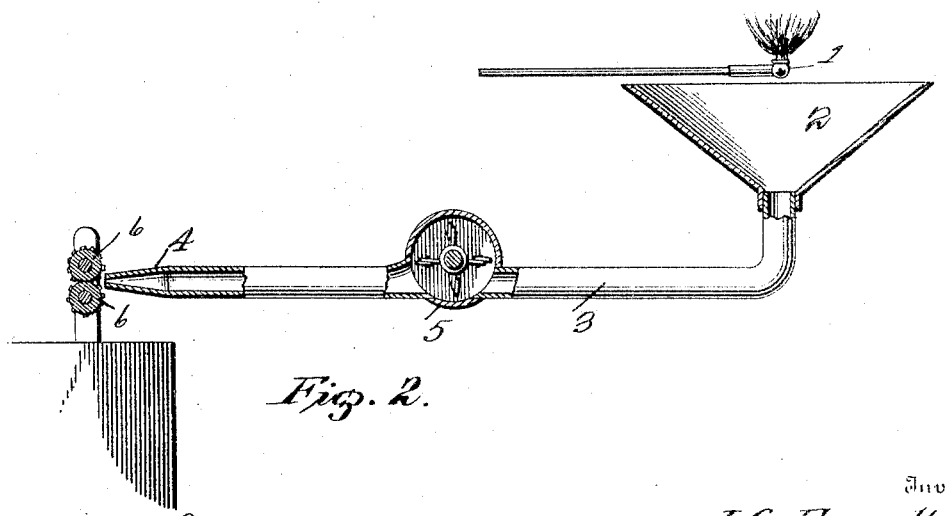

Figure 1 is a perspective view of an apparatus devised for attaining the purpose of the invention. Fig. 2 is a side elevation, parts broken away, showing the collector, crushing-rolls, and fan or draft creating device in section.

Corresponding and like parts are referred to in the following description and indicated in both views of the drawings by the same reference characters.

In practicing the invention the following steps are observed in carrying out the process—that is, attracting the insects to a given point, maintaining a draft within a given radius of the center of attraction, whereby the insects are collected, and finally crushing the insects.

For the successful operation of the process it is imperative that mechanism be devised, and to this end the apparatus illustrated has been constructed. The attracter is indicated at 1 and consists of an illuminator of any variety. The collector 2 is a funnel-shaped contrivance arranged with its mouth adjacent to the attracter and covering a space within a given radius thereof. A conveyer or pipe 3 is connected to the apex of the collector, and its delivery end is flattened and widened, as shown at 4, so as to deliver the insects to the crusher. A fan 5 is interposed in the length of the pipe or conveyer and may be of any construction. The crusher consists of companion rolls 6, geared together and arranged with reference to the delivery end of the conveyer, so as to receive the insects therefrom. The operating parts, the fan, and crusher are required to be driven by a suitable motor, an ordinary gasolene-engine being indicated at 7 for this purpose and the fan and crusher being connected thereto in any way.

The apparatus is located in the field troubled with the pests to be exterminated and the illuminator 1 lighted and the fan and crusher set in operation. The fan creates a suction through the pipe or conveyer 3, and the draft thus established draws in the insects coming within the attractive or danger zone of the illuminator and are delivered to the crusher, which completes their destruction.

Having thus described the invention, what is claimed as new is—

In an insect-exterminator, the combination of an attracter, a funnel-shaped collector, crushing-rolls, a conveyer connected to the apex of the collector and having its delivery end flattened and widened and terminating opposite the space between said crushing-rolls to deliver the insects therebetween, and a fan in the length of the conveyer for creating a suction therethrough and through the collector and about the attracter, substantially as set forth.

In testimony whereof we affix our signatures in presence of two witnesses.

JAMES C. FRANKLIN. [L. S.]
CHARLES M. BUCE. [L. S.]

Witnesses:
JOHN P. McGEE,
E. M. KIRKPATRICK.